May 14, 1929. J. FRANKENBERG 1,712,657
PRESSURE REGULATOR
Filed June 3, 1925 2 Sheets-Sheet 1
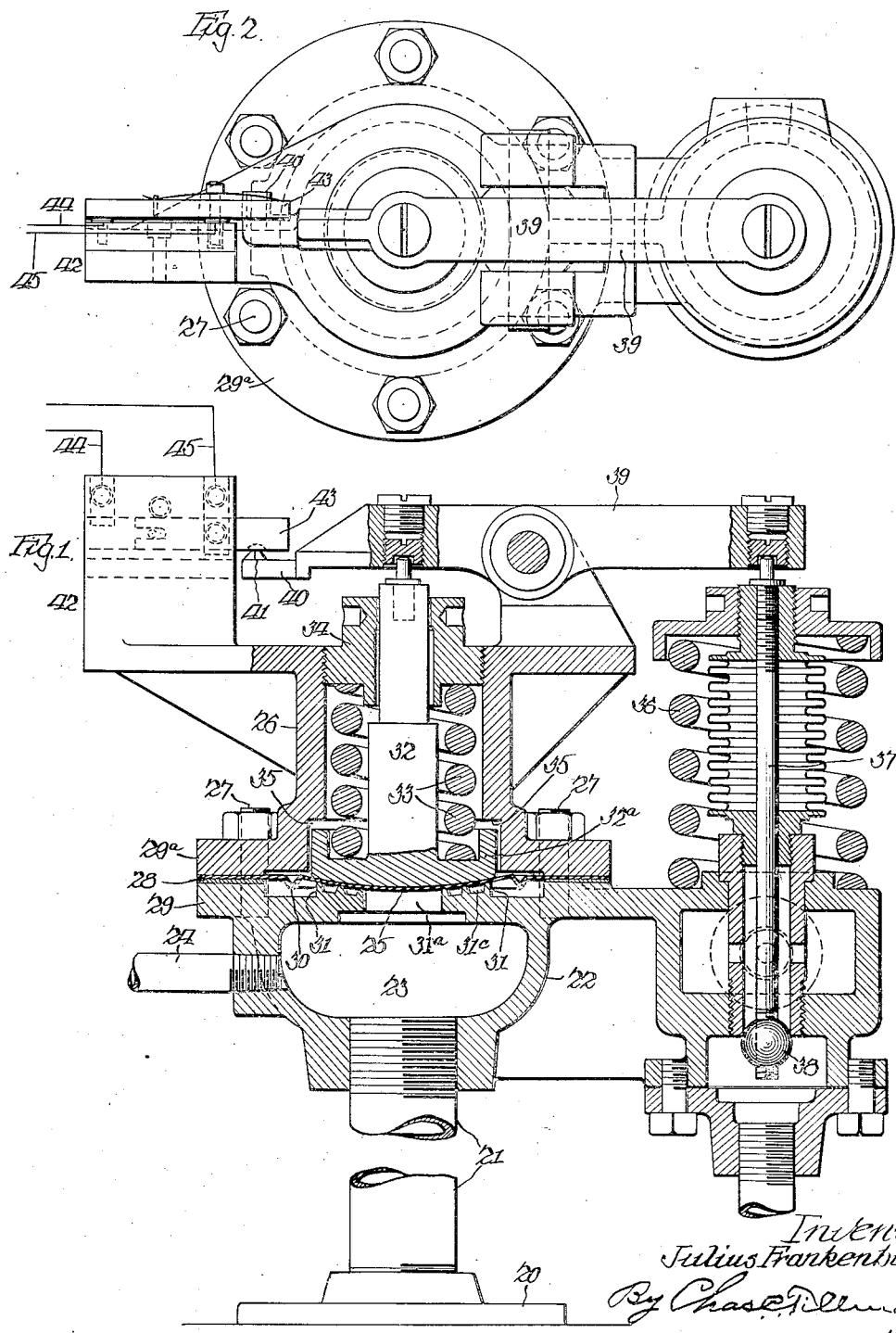

May 14, 1929.  J. FRANKENBERG  1,712,657
PRESSURE REGULATOR
Filed June 3, 1925   2 Sheets-Sheet 2
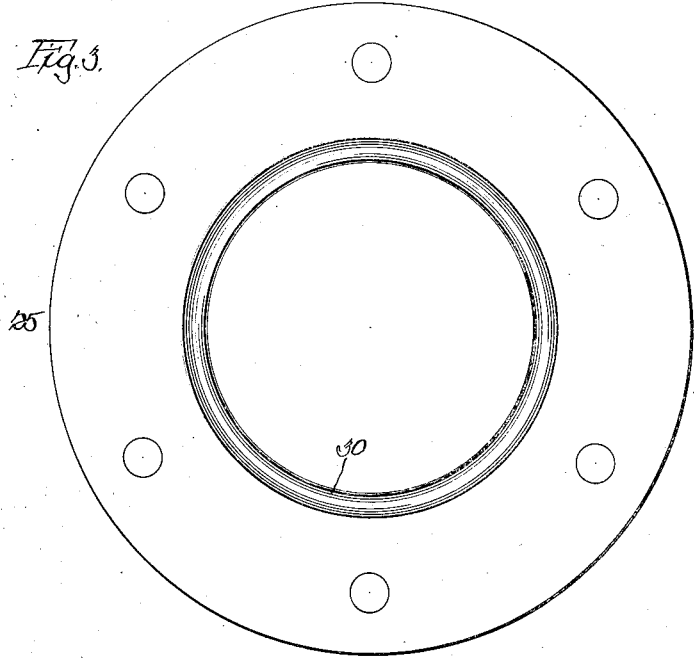
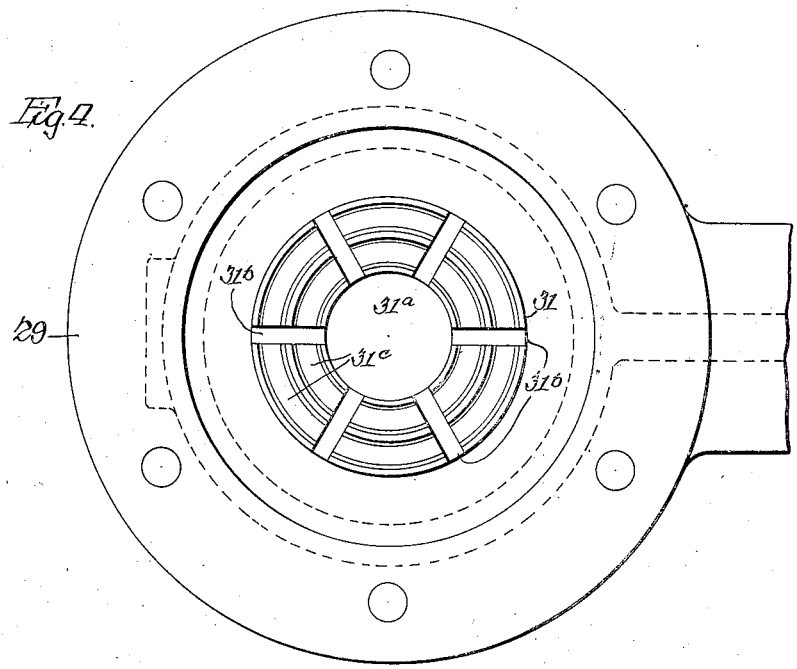
Inventor
Julius Frankenberg Patented May 14, 1929.

1,712,657

UNITED STATES PATENT OFFICE.

JULIUS FRANKENBERG, OF MILWAUKEE, WISCONSIN.

PRESSURE REGULATOR.

Application filed June 3, 1925. Serial No. 34,526.

This invention relates to improvements in pressure regulators and more particularly, pressure regulators employed in connection with domestic refrigerating apparatus using anhydrous ammonia or other kindred refrigerant, although the invention may be used for other purposes. For the purpose of better illustrating the nature of my invention, I have shown the same in connection with a water valve such as shown in my prior Patent 1,511,406, granted October 14, 1924 for improvements in automatic pressure controlling apparatus.

One of the objects of the present invention is to provide an improved apparatus, more particularly adapted for regulating the amount of water used for condensers for the purpose of liquefying gas under pressure, for refrigerating purposes, which apparatus is characterized by simplicity of construction and design, novel arrangement of parts for maintaining the proper relation between the various operative parts and provisions for unusual sensitiveness in maintaining the condenser pressure substantially constant within close limits.

A more specific object of my invention is to provide an apparatus of the character indicated, wherein is employed a diaphragm, which is subject to contact of the refrigerant, of such character and design as to practically eliminate any deterioration due to corrosive or chemical action while at the same time providing ample strength to resist the strains and stresses incident to devices of this character.

Although the present invention has relation only to the diaphragm of the apparatus exposed to the gas space of the condenser of a refrigerating machine and to its cooperating parts, yet for the purpose of providing a clear and full understanding of the invention, I have illustrated it as embodied in a complete apparatus, and will so describe it.

In the accompanying drawings, which serve to illustrate an embodiment of the invention, Fig. 1 is a central vertical longitudinal view of the apparatus partly in section and partly in elevation.

Fig. 2 is a plan view thereof.

Fig. 3 is a detached plan view of the diaphragm of the apparatus which is subject to the pressure of the condenser, and Fig. 4 is a plan view of a portion of the lower part or body of the apparatus with the said diaphragm removed, showing the construction of the lower supporting member for said diaphragm.

Like numerals of reference refer to corresponding parts throughout the different views of the drawings.

Referring now more particularly to Fig. 1 of the drawings, it will be seen and understood that the apparatus comprises a base 20 having extended upwardly therefrom a post 21 which is preferably screwed into a suitable opening in the bottom of a part of the lower body of the device. This part 22 is provided with a cavity 23 or chamber which is in permanent communication through a pipe 24 leading therefrom with the gas space of the condenser (not shown) of the refrigerating machine. The lower body of the apparatus is oblong in its main contour, as is clearly shown in Figs. 1 and 2 of the drawings, and comprises the pressure controlling elements located near one of its ends and the water valve body and water valve to be automatically controlled by said pressure controlling elements located near the other end thereof. The water valve mechanism herein shown is the same as that illustrated and described in my aforesaid patent and, per se, forms no part of the present invention. The pressure control mechanism, however, differs from that of the said patent in several respects or features, but mainly in that a disk diaphragm is employed instead of the cylindrical bellows diaphragm of the patent, this change having been found necessary on account of the metal, generally copper, of which the bellows diaphragm was made not having the necessary strength and its susceptibility to corrosion when in contact with ammonia gases. The disk diaphragm is designated as a whole by the numeral 25, and is circular in shape, having its central portion downwardly dished as clearly shown in Fig. 1, to allow sufficient movement for the full opening of the water valve, when this becomes necessary.

The diaphragm 25 is by preference made of Monel metal and of considerable thickness to withstand the heavy ammonia condenser pressures. As shown in Fig. 1, the diaphragm 25 is clamped between the flanges 29 and 29ª of the part 22 of the lower body and the part 26 of the upper body respectively of the apparatus, said flanges being securely held in their clamped positions by means of bolts 27 extended through suitable openings in the flange 29ª and seated in the flange 29.

To prevent leakage of gas a gasket 28 is interposed between one of the said flanges and the adjacent surface of the diaphragm. In order to compensate for the crowding sidewise of the dished diaphragm 25 in its upward movement, a circular concentric groove 30 substantially V-shaped with its angular or contracted portion presented downwardly is provided in the diaphragm and by preference at the periphery of the said dished portion thereof, although it will be understood that said groove may be located anywhere between the periphery of the diaphragm and the center thereof, but concentrically with respect to said center. By this novel and peculiar construction of the diaphragm I have found that it absolutely prevents setting of the heavy metal of which the diaphragm must be made on account of the great strain to which it is subjected.

When the diaphragm 25 is not exposed to any considerable amount of pressure, the same rests upon the circular upward extension 31 with which the part 22 of the lower body is provided by having its upper portion covering the chamber 23 inwardly and upwardly extended, as is clearly shown in Figs. 1 and 4 of the drawings. This extension or support 31 is provided with a central opening 31$^a$ and the top of said extension 31 is concaved to correspond with the convex contour or form of the under side of the diaphragm, and in order to distribute the gas pressure under said diaphragm, the top of said extension is provided with a number of radial grooves 31$^b$ and one or more concentrical grooves 31$^c$ having communication with said radial grooves, all of which is clearly shown in Fig. 4 of the drawings.

Upon the central portion of the diaphragm 25 a plunger 32 having an annular enlargement or head 32$^a$ of such dimensions as to completely cover the top of the extension 31, the lower surface of said enlargement or head being shaped to conform to the shape of the diaphragm, is employed. The plunger head 32$^a$ is guided vertically by the lower end of the shallow cylindrical guide-way 35 located in the bottom of the upper body 26 and the upper portion of the plunger 32 is guided by an apertured screw plug 34 in threaded engagement with the upper portion of the cylindrical part of the upper body 26, as shown in Fig. 1 of the drawings. A coil spring 33 rests at its lower end on the plunger head 32$^a$ and is held centrally by both the plunger 32 and the screw plug 34 with which its upper end contacts.

In my present invention it is necessary to provide means for regulating the tension of the two heavy or strong coil springs 33 and 36 as the size or tension exerted by the spring 36 is limited by the tensile strength of the stem 37 of the water valve 38 in order to counter-balance the pressure exerted by the diaphragm 25, also to prevent the ball valve 38 wearing out of shape. By the employment of the screw plug 34 for not only guiding the plunger 32 but for regulating the tension of the spring 33 and by the employment of the means to be hereinafter mentioned for regulating the tension of the spring 36, it is obvious that the just above mentioned results can be readily effected.

As in the structure of my aforesaid patent, a fulcrum lever 39 located above the water valve and centrally with the axis of the plunger 32 and with the axis of the water valve stem 37 is employed, which water valve is identical in construction and operation with that of my aforesaid patent and is mounted in a similar manner, consequently a detail description thereof herein is unnecessary. The fulcrum lever 39 is mounted, arranged and operates in substantially the same way as the corresponding lever of my aforesaid patent, but is modified in its construction to the extent that the support designated 77 in the said patent, for the auxiliary spring designated therein by the numeral 78, as well as the means shown in the patent for limiting its upward movement at one end, is omitted, and said end of the lever 39 is provided with a laterally extended arm 40 having an upward projection 41 for engagement with and operation of an electric safety switch employed for controlling the operation of the motor driving refrigerating machine.

As before mentioned, the chamber 23 of the lower part 22 of the body of the apparatus is in permanent communication with the gas space of the condenser. When the condenser pressure has reached the desired amount, the diaphragm 25 will be pressed upwardly to open the water valve sufficiently to maintain the standard desired condenser pressure. As the fulcrum lever 39 is arranged, it will require but a slight movement of the said diaphragm for ordinary purposes. Since the bottom of the head 32$^a$ of the plunger conforms to the shape of the diaphragm 25, it is evident that for the working condenser pressures the diaphragm will be thoroughly supported, which is vital for the continued accurate performance of the apparatus. The concentric groove 30 adds increased flexibility to the said diaphragm to a marked degree, besides strengthening said member. The safety switch above referred to is operated by the fulcrum lever 39 so as to shut off the current to the motor whenever the condenser pressure shall reach a certain predetermined degree. The maximum deflection of the diaphragm will have been reached when the upper surface of the plunger head 32$^a$ strikes the shoulder thereabove of the guide-way 35, and in this position the diaphragm 25 approximately forms a flat surface, is well supported by the bottom surface of the plunger head 32$^a$, and therefore is capable of sustaining such maximum pressures to which the diaphragm may be exposed but very rarely.

Again referring to the switch, which is indicated as a whole by the numeral 42, upon the upward movement of the member 32, occasioned by the pressure through the pipe 24, on the diaphragm 25, it is apparent that the end of the lever 39, adjacent said switch will be moved upwardly, thus causing the adjacent end of the lever 43, to be raised, thereby lowering its other end and thus breaking the circuit through the conductors 44, and 45, which lead to the motor (not shown) used for driving the refrigerating machine.

Having thus fully described my invention, what I claim as new and desire to secure by Letters Patent is:

1. In a pressure regulator, the combination with a housing having a ported support provided with a concaved surface seat, said housing having an annular recess around the periphery of said support; of a sheet metal diaphragm secured around its periphery and outwardly of said annular recess in said housing, said diaphragm having a central, initially dished portion so arranged that the convex side thereof is adapted to seat on said concave seat and provided also with an annular corrugation located in said annular recess; and a spring influenced plunger having limited reciprocatory movement on the opposite side of said diaphragm, said plunger being provided with a convex end arranged to seat against the concave side of said dished portion of the diaphragm when the latter is seated on said concave seat.

2. In a pressure regulator, the combination with a housing having a ported support provided with a concaved surface seat, the latter being provided with fluid pressure equalizing recesses in communication with the port; of a diaphragm secured around its periphery in said housing, said diaphragm having a central, initially dished portion so arranged that the convex side thereof is adapted to seat on said concave seat; and a spring influenced plunger having limited reciprocatory movement on the opposite side of said diaphragm, said plunger being provided with a convex end arranged to seat against the concave side of said dished portion of the diaphragm when the latter is seated on said concave seat.

JULIUS FRANKENBERG.